No. 674,077. Patented May 14, 1901.
A. D. COLES.
PIPE COUPLING OR UNION.
(Application filed Nov. 28, 1900.)
(No Model.)
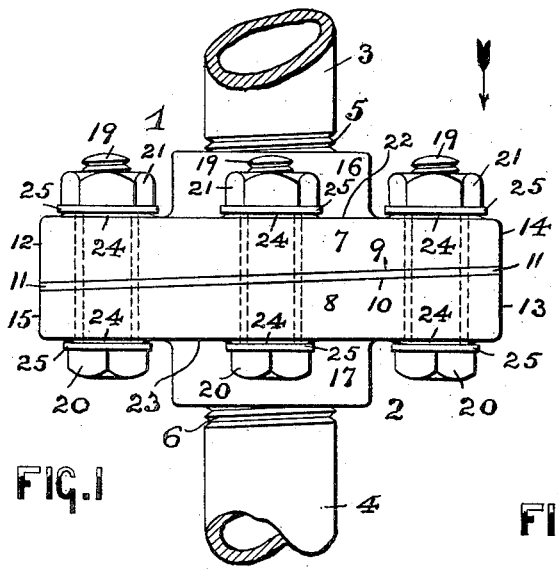
FIG. 1.
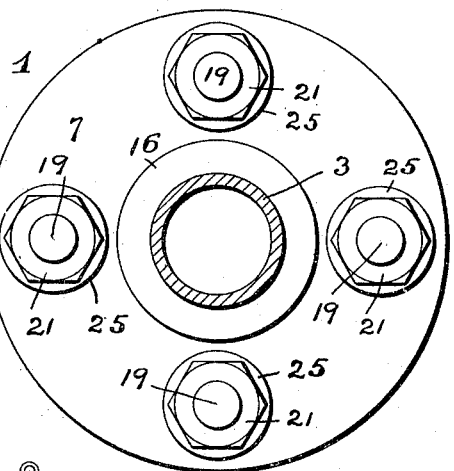
FIG. 2.
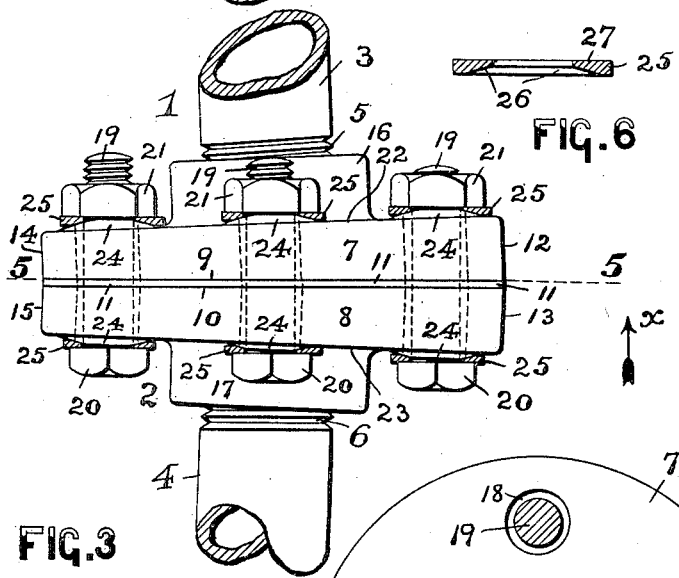
FIG. 3.
FIG. 6.
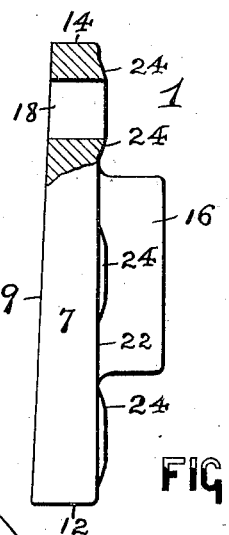
FIG. 4.
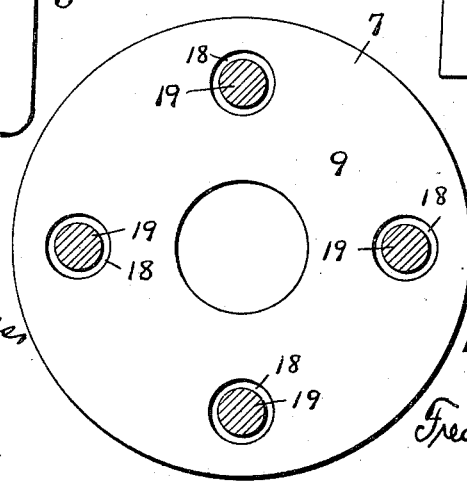
FIG. 5.
WITNESSES:
Geo. D. Richards
Jos. Salmon
INVENTOR:
ALBERT D. COLES,
BY
Fred L. C. Fraentzel
ATTORNEY
THE NORRIS PETERS CO., PHOTO-LITHO., WASHINGTON, D. C.

UNITED STATES PATENT OFFICE.

ALBERT D. COLES, OF NEWARK, NEW JERSEY.

PIPE COUPLING OR UNION.

SPECIFICATION forming part of Letters Patent No. 674,077, dated May 14, 1901.

Application filed November 28, 1900. Serial No. 37,975. (No model.)

*To all whom it may concern:*

Be it known that I, ALBERT D. COLES, a citizen of the United States, residing at Newark, in the county of Essex and State of New Jersey, have invented certain new and useful Improvements in Pipe Couplings or Unions; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention relates generally to improvements in pipe-couplings, and more particularly to the novel construction of pipe-union to be hereinafter fully described.

The invention has for its principal object a novel construction of pipe union or coupling the two sections of which are capable of proper adjustment, whereby the union-sections can be used for connecting two sections of pipe which are perfectly straight or in alinement with each other or the same union can be employed for properly connecting two sections of pipe which are out of direct alinement.

The invention therefore consists in the production of a pipe union or coupling to be used in connection with two pipe-sections irrespective of whether the pipe-sections are in true and direct alinement or whether their ends are arranged at an angle to each other, thereby obviating the necessity of bending the pipe-sections to enable the proper placing of the two union-sections end to end to produce a tight and perfect joint.

With the several ends hereinabove stated in view my invention consists, further, in the several novel features to be hereinafter fully described in the following specification and then more particularly pointed out in the clauses of the claim hereto appended.

The invention is clearly illustrated in the accompanying drawings, in which—

Figure 1 is a side view of the union or pipe-coupling embodying the principles of this invention and illustrating its use in connecting two sections of pipe which are in direct alinement. Fig. 2 is an end view of the union or pipe-coupling. Fig. 3 is a side view of the union or pipe-coupling with the two union-sections represented in one of their adjusted positions connecting the ends of two pipe-sections which are out of alinement. Fig. 4 is a side view of one of the union-sections, a portion of the same being represented in vertical section. Fig. 5 is a cross-section taken on line 5 5 in Fig. 3 looking in the direction of the arrow $x$ in said figure; and Fig. 6 is a vertical cross-section of one of the washers which may be employed with the pipe union or coupling, said washer being represented on a slightly-enlarged scale.

Similar numerals of reference are employed in all of the said above-described views to indicate corresponding parts.

Referring to the said drawings, 1 and 2 represent the two sections of the union or coupling into which are to be screwed the respective ends 5 and 6 of the two sections of pipe 3 and 4. The union or coupling sections 1 and 2 are respectively provided with the annular flanges 7 and 8, the abutting end surfaces 9 and 10 of the same, and between which may be arranged a gasket or packing-ring 11, being made tapering, substantially as illustrated in Figs. 1, 3, and 4. The flanges have their greatest thickness through the parts marked by the numerals 12 and 13 in the respective flanges 7 and 8 and are thinnest through the parts marked by the numerals 14 and 15.

From an inspection of Fig. 1 it will be understood that when the tapering and abutting end surfaces 9 and 10 of the respective flanges are placed together to bring the thickest part 13 of the flange 8 directly opposite the thinnest part 14 of the flange 7 and the thickest part 12 of the flange 7 directly opposite the thinnest part 15 of the flange 8, then the two union or coupling sections 1 and 2 will have their respective receiving-sockets 16 and 17 in direct alinement for the proper reception of the screw ends 5 and 6 of the two pipe-sections 3 and 4 which are to be connected in a direct and straight line. Each flange 7 and 8 is provided with any suitable number of bolt-holes 18, through which are passed bolts 19, provided with the heads 20 and nuts 21 for tightly drawing the tapering surfaces of the flanges against each other or against the packing-ring or gasket 11, that may be arranged between said flanges, as shown.

When it is desired to connect the ends of two pipe-sections at an angle, as indicated in Fig. 3, to conform the pipe to any angular inequalities in the wall or ceiling against which the pipe is to be secured or for any other purposes where such angular arrangement of the pipe-sections is required, all that is necessary is to place the tapering and abutting surfaces of the flanges together in such a manner that the thin parts of the flanges will be opposite each other, and the thick portions of the flanges will in like manner be brought opposite each other. This causes the receiving-sockets 16 and 17 of the respective union or coupling sections 1 and 2 to be thrown out of direct alinement for the purpose of connecting two pipe-sections at an angle to each other as desired. The flanges 7 and 8 are usually provided with four bolt-holes 18 and the corresponding number of bolts therein, which permits of four adjustments of the pipe coupling or union; but of course it will be clearly understood that I may provide the flanges 7 and 8 with but two or with three holes or more than four holes and the corresponding number of bolts to permit of a smaller or a greater number of adjustments of the coupling or union sections, either to the right or left or up or down, when necessary to meet different existing conditions.

In order to enable the proper use of the bolts 19 with the tapering flanges 7 and 8 when they have been adjusted to connect the pipe-sections at an angle, the diameter of each hole 18 is slightly larger than the diameter of the bolt to be arranged therein, in the manner clearly indicated in Fig. 3 of the drawings. Furthermore, to prevent any binding action or distortion of the bolts and of their heads and nuts against the surfaces 22 and 23 of the respective flanges 7 and 8 each hole 18 may be surrounded on the surfaces 22 and 23 with a raised convex portion 24, upon which is placed a washer 25. Each washer has a concave part 26, which surrounds the hole of the washer, and is also provided with a flat surface 27, as clearly represented in Fig. 6. When these washers are employed with the pipe union or coupling herein described, the concavo part 26 of a washer is placed upon and made to register with one of the raised and convex portions 24. In this manner both the head and nut of each bolt will have a flat bearing-surface, as clearly shown in Figs. 1 and 3, thereby enabling the parts to be tightly and properly secured together in their adjusted relation to each other, as will be clearly evident.

The herein-described device is very simple in its construction and is of great usefulness, especially in connection with sections of pipe of large diameters, which where such pipes have to be connected at an angle cannot be readily bent.

I am aware that some changes may be made in the details of the construction of the parts of the pipe union or coupling without departing from the scope of my present invention. Hence I do not limit my invention to the precise arrangements and combinations of the various parts as herein described and as illustrated in the drawings, nor do I confine myself to the exact details of the construction of any parts of the device.

Having thus described my invention, what I claim is—

1. A pipe union or coupling, consisting of two sections, provided with means for attaching each section to the end of a pipe, a flange on each section, having a tapering surface, bolt-holes in said flanges adapted to register when the tapering surfaces of said union or coupling sections are brought together, a convex portion encircling each bolt-hole in said flanges, a washer having a concave portion adjustably arranged on each convex portion, bolts in said bolt-holes and washers, having their heads and nuts arranged against said washers, for securing said flanges together and their tapering surfaces face to face, the said flanges being rotatably adjustable in relation to each other, and the bolts being interchangeable in the bolt-holes, so as to secure the union or coupling sections either in direct alinement or at an angle to each other, substantially as and for the purposes set forth.

2. A union-section having a pipe-receiving socket, a flange 7, and a tapering surface 9, bolt-holes in said flange, and a convex portion 24 encircling each bolt-hole, all arranged, substantially as and for the purposes set forth.

In testimony that I claim the invention set forth above I have hereunto set my hand this 24th day of November, 1900.

ALBERT D. COLES.

Witnesses:
    FREDK. C. FRAENTZEL,
    GEO. L. DEMAREST.